July 6, 1926.
W. M. FULTON
1,591,085
TEMPERATURE REGULATOR
Filed Nov. 8, 1920   2 Sheets-Sheet 1
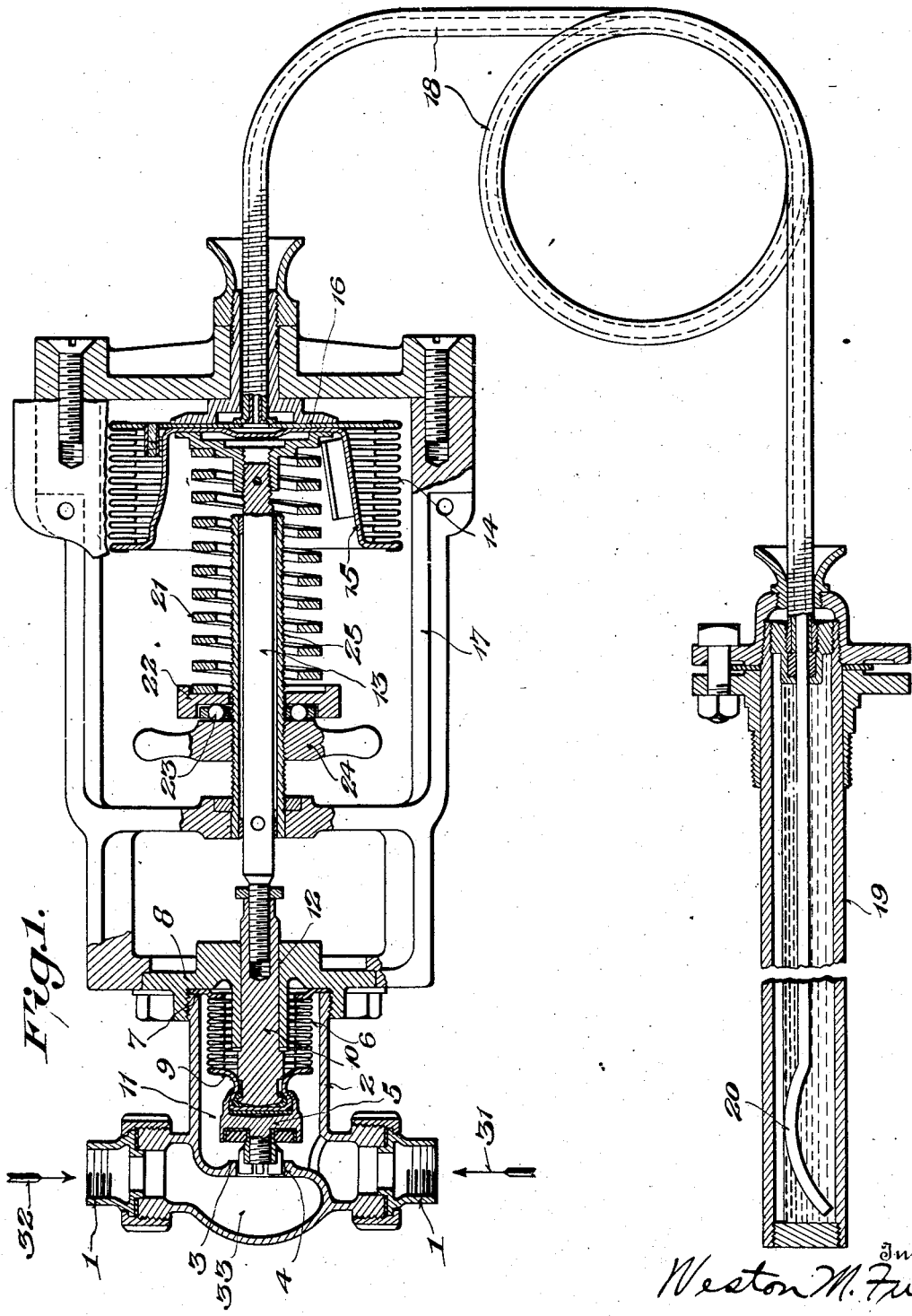
Inventor
Weston M. Fulton
By Mauro, Cameron, Lewis & Kirkam
Attorneys

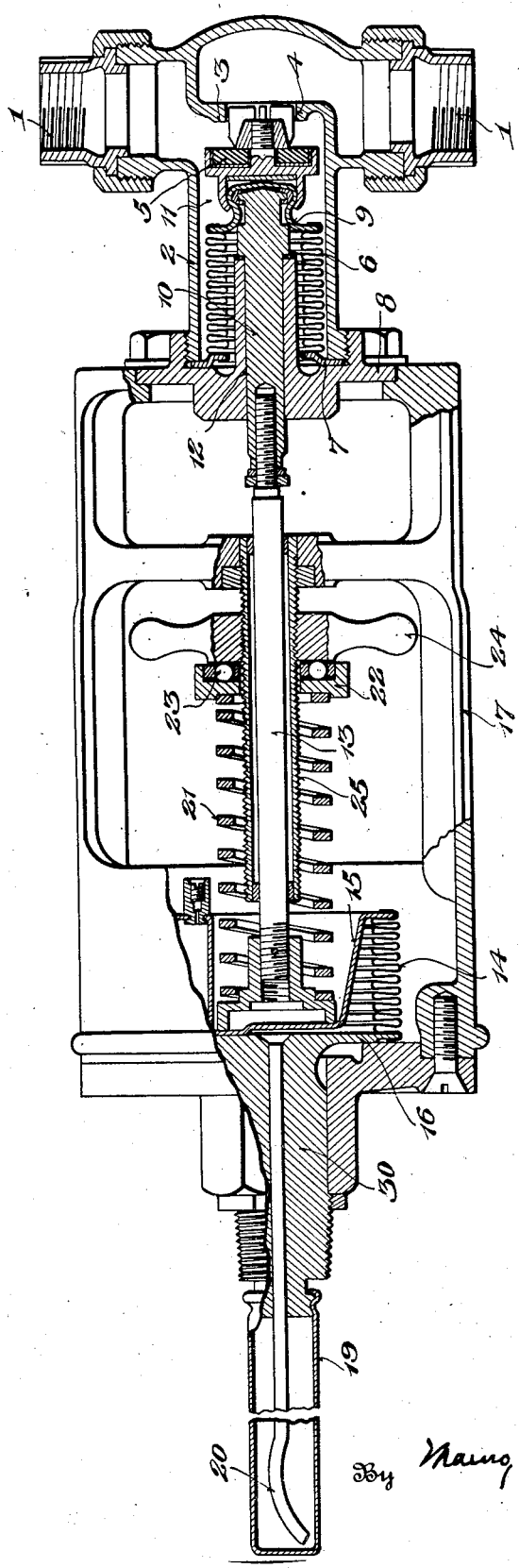

Patented July 6, 1926.

1,591,085

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

TEMPERATURE REGULATOR.

Application filed November 8, 1920. Serial No. 422,586.

This invention relates to automatic regulating devices, especially temperature regulators, and while capable of use in a wide variety of devices of this type, has particular utility when embodied in means for regulating the flow of a heating medium to a tank or other receptacle for containing a heated medium.

In devices of this type wherein a valve is opened and closed by thermosensitive means, the gradual response of said thermosensitive means to temperature changes tends to gradually move the valve toward and away from its seat so that just prior to closing and immediately after opening a narrow annular space is left between the valve member and its seat through which the heating medium rushes under pressure to wear and score the valve member and its seat. This is particularly true when steam is employed as the heating medium, producing the defect known as "wire drawing". This scoring of the valve member and its seat causes the valve to leak and thereafter renders sensitive control of the temperature of the heated medium impossible. This defect may be overcome in part by rendering the valve unbalanced and admitting the heating medium thereto so that it tends to hold the valve to its seat. But experience has demonstrated that it is exceedingly difficult to get workmen to always install a device of this character so that the flow of heating medium is in the proper direction for the unbalanced pressure to tend to hold the valve to its seat whereby, either through carelessness or indifference, the installation is frequently made without respect to the direction of the flow of the heating medium with respect to the valve. Consequently, if the installation be made so that the heating medium flows past the valve in the wrong direction, the tendency for the valve to cause "wire drawing" is accentuated by the tendency of the pressure acting thereon to retard its movement toward and away from its seat.

It is an object of this invention to provide a regulating device with means cooperating with the valve to accelerate its movement both toward and away from its seat in whichever direction the heating medium is flowing with respect thereto.

In my Patent No. 1,102,035, granted June 30, 1914, a tank regulator is disclosed in which the valve is automatically operated by a thermostat comprising an expansible and collapsible vessel and a bulb in communication therewith, said bulb being charged with a volatile liquid, said vessel and its connections with said bulb being maintained full of liquid, and said bulb being so related to said connections that the vapor of said volatile liquid is trapped in said bulb. The diminishing mass of volatile liquid in the bulb as the temperature rises and the vapor tension forces said liquid into said connections and vessel to expand the latter causes acceleration of the valve as it approaches its seat, whereby "wire-drawing" is decreased to a greater or less extent. The full advantage in the use of this diminishing mass of volatile liquid can be secured, however, only if the valve be so related to the flow of heating medium that its pressure does not tend to retard the movement of the valve toward its seat.

It is an object of this invention to provide a regulating device with means, cooperating with the valve to accelerate its movement both toward and away from its seat, which can be combined with a thermostat of the type disclosed in said patent and take full advantage of the variable mass action of said thermostat in whichever direction the heating medium may flow with respect to said valve.

In order to adjust the temperature at which a regulating device of the type in question operates to open and close the valve, it has been suggested to oppose movement of the valve by an adjustable spring or weight. A spring possesses the disadvantage that a varying force is necessary to overcome its varying tension, so that the movement of the valve as it approaches its seat may be retarded by the increasing tension of the spring. Therefore, adjustable weights have been used extensively in opposing the movement of the valve in one direction, notwithstanding that they substantially increase the bulk and weight of the device, because of the substantially uniform opposition that they afford to the movement of the valve.

It is an object of this invention to provide a regulating device with a spring for opposing movement of the valve in one direction and to supply said regulating device with means cooperating with the valve to accelerate its movement adjacent its seat notwithstanding the variable opposition of said spring.

Again, in regulating devices of the type in question as heretofore constructed, the valve stem has been provided with a packing gland to prevent leakage therearound. In order that leakage shall be prevented, however, it is necessary that the packing bear with considerable pressure on the valve stem so that considerable frictional resistance is opposed to the movement of the valve. This has a substantial effect upon the temperatures at which the valve is opened and closed because, although the thermostat may be set to operate the valve at a given temperature, the temperature must rise above the predetermined degree before it can develop sufficient additional power to overcome the frictional resistance while, on the other hand, it must drop below the predetermined degree before the spring or weight will act to overcome said frictional resistance.

It is an object of this invention to provide a regulating device with means forming a fluid-tight joint with the valve stem and valve housing which will oppose a minimum resistance to the movement of the valve so that the device may regulate the temperature more closely and, therefore, be more sensitive to temperature changes.

Other objects of the present invention relate to the provision of a regulating device which is simple in construction, efficient in operation and inexpensive to manufacture and install.

Stated broadly, the invention comprises a valved conduit, automatic means for operating the valve, and a member operatively connected to said valve and subjected to the pressure in said conduit, said member being adapted to automatically accelerate the movement of the valve both toward and away from its seat in whichever direction the heating medium may flow with respect thereto. Said member is preferably a flexible wall and makes fluid-tight joints with the valve stem and valve housing. The automatic means for operating the valve may be of any suitable construction, but is desirably of the type disclosed in my Patent No. 1,102,035 above referred to, in which event a spring may be utilized for opposing movement of the valve in one direction owing to the automatic acceleration afforded by the member cooperating with the valve.

The invention is capable of receiving a variety of mechanical expressions, two of which are shown on the accompanying drawings, but it is to be expressly understood that the drawings are for purposes of illustration only and are not to be construed as a definition of the limits of the invention, reference being had to the appended claims for that purpose.

Referring in detail to said drawing, wherein the same reference characters are used to designate corresponding parts in both figures:—

Fig. 1 is an elevation partly in section of a temperature regulator embodying the present invention and employing a thermostat of the type disclosed in my aforesaid patent; and Fig. 2 is an elevation partly in section of another regulating device embodying the present invention and employing a thermostat of modified construction.

In the form shown in Fig. 1, 1 designates a conduit for conveying any suitable heating medium and 2 designates a valve housing of any suitable construction interposed in said conduit. Said valve housing 2 is provided interiorly in any suitable way with a valve seat 3, the port 4 of which is designed to be opened and closed by a valve member 5 of any suitable construction.

In conformity with the present invention, a member is operatively connected to said valve member 5 and cooperates therewith to accelerate its movement adjacent its seat both when opening and when closing the port 4 therein. Said member may be of any suitable construction, but preferably constitutes a fluid-tight packing for the valve and takes the form of a flexible wall which makes a fluid-tight joint with both the valve or its stem and the valve housing. In the form shown, said member is composed of a corrugated, expansible and collapsible wall 6, which is flanged at 7 and tightly clamped to the housing 2 by the bonnet 8, and which has a movable end wall 9 which is preferably imperforate and suitably attached to the valve member 5 and the valve stem 10. Said movable end wall 9 is larger than the valve member 5 so that its surface subjected to the pressure in the chamber 11 at one side of the valve seat is of larger effective area than the opposed surface of said valve member 5.

The valve stem 10 has a free sliding fit in the aperture 12 through the bonnet 8 and is operatively connected, as by the stem 13, to automatic means of any suitable construction for operating said valve. Said automatic means preferably takes the form of a thermostat, and said thermostat may be of any suitable construction. In the form shown in Fig. 1, a thermostat of the general type disclosed in my Patent No. 1,102,035 above identified is illustrated, and comprises a vessel having a flexible wall, shown as a corrugated expansible and collapsible vessel 14 the movable end wall 15 of which is operatively connected in any suitable way to the stem 13. The opposite and stationary end wall 16 of said vessel 14 is suitably carried by a frame 17 which may be mounted desirably on the bonnet 8 of the valve housing 2. Said vessel 14 communicates through a flexible elongated conduit or tube 18 with a bulb 19, designed to be suitably retained in heat-interchanging relation with the medium to be heated in a tank or other receptacle. Said bulb 19 is charged with a volatile liquid which partially fills the same, while the tube 18 and the vessel 14 are maintained full of liquid, said bulb being so related to said connecting tube that the vapor of the volatile liquid is trapped in said bulb. This may be accomplished in any suitable way, but in order that the vapor may be trapped in the bulb whether the latter is in vertical or horizontal position, the tube 18 may be extended to a point adjacent the free end of the bulb, as shown at 20, and may, if desired, be bent at said end so as to present its opening adjacent the wall of the bulb. It is to be expressly understood, however, that said bulb and expansible and collapsible vessel, as well as the connections therebetween and the mountings therefor, may be of any other suitable construction and are therefore not described in further detail.

In order to predetermine the temperature at which the thermostat responds to operate the valve, the expansion of said vessel 14 is preferably opposed by a coil spring 21, which is shown as encircling the stem 13 and in engagement at one end with the movable end wall 15 of said vessel. Any suitable means may be provided for adjusting the tension of said spring and, in the form shown, the opposite end of said spring engages a collar 22 which has a ball bearing 23 on a hand nut 24 which is threaded onto a sleeve 25 surrounding the stem 13.

In the form shown in Fig. 2, the construction is substantially the same as that illustrated in Fig. 1 except that the elongated flexible tube 18 is omitted and the bulb 19 communicates directly with the expansible and collapsible vessel 14 through the aperture in the elongated hub 30 to which said bulb and vessel are respectively attached.

In operation, assume that the heating medium, as steam, is flowing in the direction of the arrow 31. When the valve is closed the pressure in the chamber 11 tends to open said valve by a force equal to the difference in area between the movable end wall 9 and the upper face of said valve times said pressure. This unbalanced force plus the tension of the spring 21 is opposed by the thermostat. When the temperature drops sufficiently so that the condensation of vapor in the bulb 19 permits the spring 21 to begin to collapse the vessel 14, the valve 5 begins to open, and immediately that the heating medium begins to flow therepast, a pressure is built up on the underface of said valve. This increment of pressure balances some of the pressure on the upper face of the valve, or adds to the unbalanced pressure acting on the movable end wall 9 and accelerates the movement of the valve away from its seat. The farther the valve moves from its seat the more nearly the pressure on its underface approximates that in the chamber 11, until the unbalanced pressure acting to move the valve away from its seat is equal to the area of the movable end wall 9 times said pressure. It will be perceived that, while the unbalanced pressure tending to open the valve when the latter is closed is equal to the difference in area between the movable end wall 9 and the upper face of the valve times the pressure, the unbalanced force tending to open the valve when the latter is open is equal to the area of the movable end wall 9 times said pressure, so that from the instant the valve begins to leave its seat there is an increasing unbalanced pressure tending to open the same whereby said valve moves with acceleration away from its seat.

Conversely, when the temperature rises so that the vapor tension in the bulb 19 is sufficient to overcome the tension of the spring 21 and the unbalanced pressure tending to maintain the valve open, vessel 14 expands to move the valve 5 toward its seat. But, as said valve approaches its seat, the pressure on its underside falls off, so that there is a diminution in the unbalanced force opposing movement of the valve, which varies from the area of the movable wall 9 times the pressure to the difference in area between said movable end wall 9 and the upper surface of the valve times said pressure. As the moving force is constant and the opposing force is diminishing, it is apparent that said valve will approach its seat with acceleration.

On the other hand, suppose that the heating medium is flowing in the direction of the arrow 32 so that the pressure is applied to the valve in the chamber 33.

Disregarding the difference in area between the port and the valve member, the unbalanced force tending to open the valve is the area of the lower face of the valve times the pressure. As soon as the valve begins to open, pressure builds up in the chamber 11 and, while part of the pressure on the underface of the valve is balanced by the increment of pressure acting on the upper face of the valve, the pressure in the chamber 11 is applied to the movable end wall 9 which is larger than the valve. Therefore, there is a gradient of pressure as the valve moves away from its seat which increases from the area of the valve times the pressure to the area of the movable end wall 9 times the pressure. Therefore, there is a force tending to accelerate the opening of the valve.

Conversely, when the valve is being closed, the pressure opposing movement thereof decreases from an amount equal to the area of the movable end wall 9 times the pressure to an amount equal to the area of the lower face of the valve times the pressure. As the moving force is constant and the opposing force diminishing, it is apparent that here again the valve approaches its seat with acceleration.

It will therefore be perceived that a regulating device has been provided wherein a member cooperates with the valve to accelerate its movement both toward and away from its seat and which is operative to accelerate such movement in whichever direction the heating medium is flowing with respect to said valve. Consequently, it becomes no longer necessary to install the valve in any particular way with respect to the direction of flow of the heating medium, and the carelessness or indifference of the workmen, in making the installation, as to the direction of flow of the heating medium no longer becomes material.

At the same time, a regulating device has been provided with means for accelerating the movement of the valve with respect to its seat which is available for use with a thermostat employing the principle disclosed in my Patent No. 1,102,035 and which effects acceleration of the valve in a device of that character in whichever direction the heating medium may flow with respect thereto.

Furthermore, as the valve is provided with means to accelerate its movement adjacent its seat, a spring may be utilized for predetermining the temperature at which the thermostat responds without danger of the increasing tension of the spring causing the valve to have a retarded movement adjacent its seat, with the attendant scoring and wearing of the valve parts.

Additionally, as the valve stem may slide freely in its bonnet 8 and the frictional opposition to movement of a tight packing gland is replaced by the relatively small resistance of a flexible wall, the device will respond more promptly to temperature changes and is more sensitive in action.

The effective area of the movable member operatively connected to the valve may be selected to provide the desired acceleration taking into consideration the size of the valve to be used and the pressure to which the heating medium is subjected and, therefore, the regulating device may be used with higher pressures and with larger valves than has heretofore been possible owing to the rapid destruction of the valve in prior devices when large valves or high pressures were used.

While the embodiments of the invention shown on the drawings have been described with considerable particularity, it is to be expressly understood that the invention is not limited thereto as the same is capable of receiving a variety of mechanical expressions, some of which will readily suggest themselves to those skilled in the art, while certain features thereof may be used without other features thereof. Changes may also be made in details of construction, arrangement and proportion of parts without departing from the spirit of this invention. Reference is therefore to be had to the claims hereto appended for a definition of the limits of the invention.

What is claimed is:—

1. In a temperature regulator, the combination of a conduit for conveying a heating medium, a valve for controlling the flow of heating medium through said conduit, a flexible wall operatively connected to said valve and subjected to the pressure in said conduit, said wall having a larger effective area than that of the opposed surface of said valve, a vessel having a flexible wall connected to said valve, and a bulb in communication with said vessel, said bulb and vessel being charged with a volatile liquid and said bulb being so connected to said vessel as to trap the vapor of said liquid in said bulb.

2. In a tank regulator, the combination of a conduit for conveying a heating medium, a valve for controlling the flow of heating medium through said conduit, a corrugated, expansible and collapsible vessel having a movable end wall connected to said valve and subjected to the pressure in said conduit, said movable end wall having a larger effective area than said valve, a second expansible and collapsible vessel connected to said valve, and a bulb in communication with said last-named vessel, said last-named vessel and its connections with said bulb being filled with liquid, and said bulb being charged with a volatile liquid and so related to said connections that the vapor of said volatile liquid is trapped in said bulb.

In testimony whereof I have signed this specification.

WESTON M. FULTON.